Oct. 10, 1950 G. W. VON HOFE ET AL 2,525,741
LABEL ACTIVATING AND APPLYING APPARATUS
Filed May 1, 1947 8 Sheets-Sheet 1
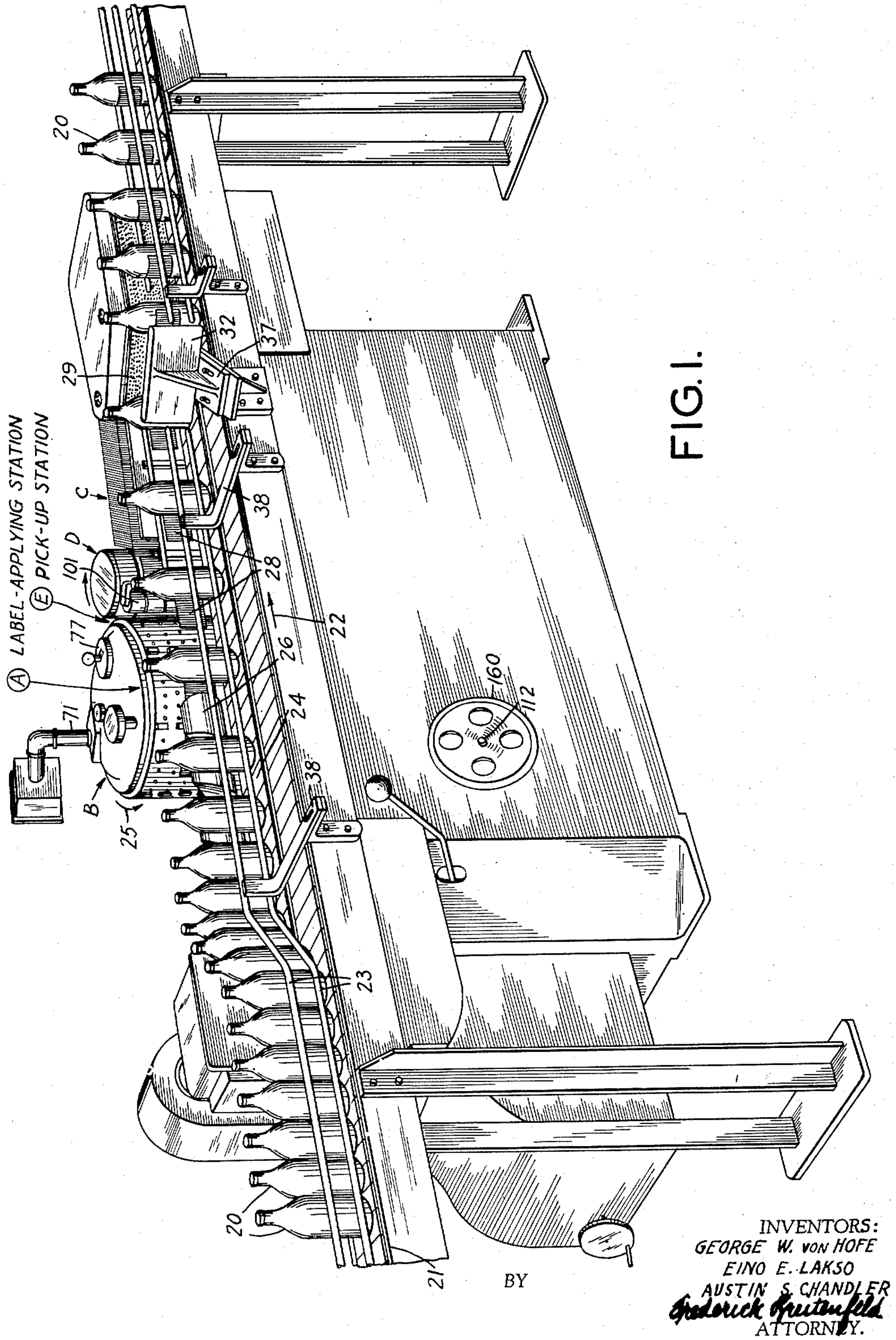
FIG. I.
INVENTORS:
GEORGE W. VON HOFE
EINO E. LAKSO
AUSTIN S. CHANDLER
BY Frederick Breitenfeld
ATTORNEY.

LABEL ACTIVATING AND APPLYING APPARATUS
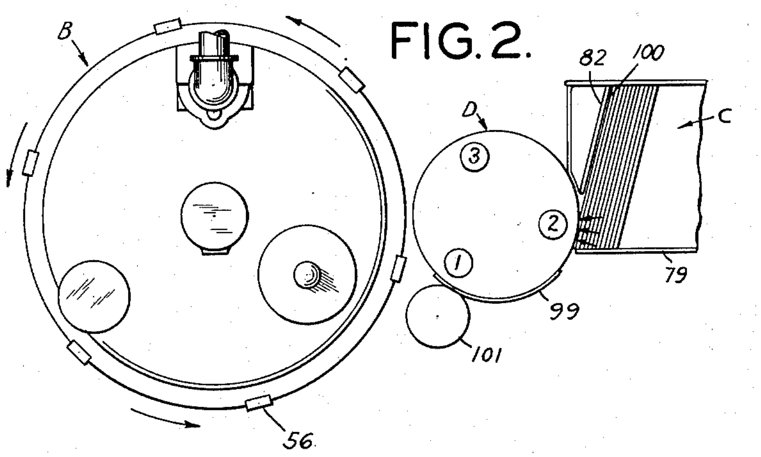
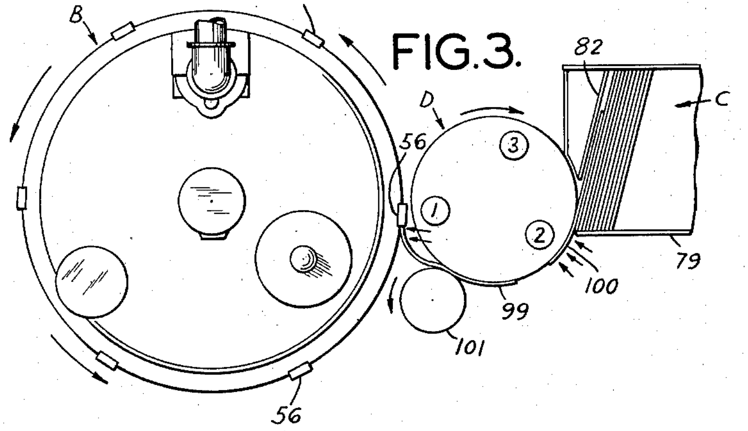
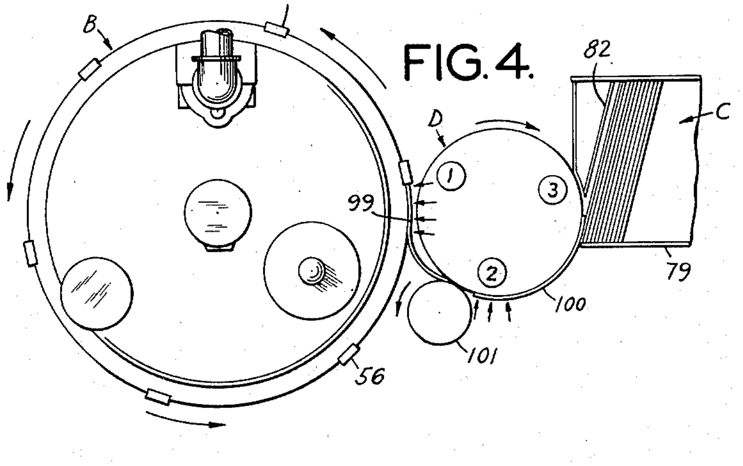
INVENTORS:
GEORGE W. von HOFE
EINO E. LAKSO
AUSTIN S. CHANDLER
BY
Frederick Breitenfeld
ATTORNEY.

Oct. 10, 1950 G. W. VON HOFE ET AL 2,525,741

LABEL ACTIVATING AND APPLYING APPARATUS

Filed May 1, 1947 8 Sheets-Sheet 3

INVENTORS:
GEORGE W. VON HOFE
EINO E. LAKSO
AUSTIN S. CHANDLER
BY Frederick Breitenfeld
ATTORNEY.

LABEL ACTIVATING AND APPLYING APPARATUS

Filed May 1, 1947 8 Sheets-Sheet 4

INVENTORS:
GEORGE W. VON HOFE
EINO E. LAKSO
AUSTIN S. CHANDLER
BY
Frederick Breitenfeld
ATTORNEY.

INVENTORS:
GEORGE W. VON HOFE
EINO E. LAKSO
AUSTIN S. CHANDLER
BY Frederick Breitenfeld
ATTORNEY.

LABEL ACTIVATING AND APPLYING APPARATUS

INVENTORS:
GEORGE W. VON HOFE
EINO E. LAKSO
AUSTIN S. CHANDLER

BY Frederick Breitenfeld
ATTORNEY.

Oct. 10, 1950    G. W. VON HOFE ET AL    2,525,741

LABEL ACTIVATING AND APPLYING APPARATUS

Filed May 1, 1947    8 Sheets-Sheet 7

INVENTORS:
GEORGE W. VON HOFE
EINO E. LAKSO
AUSTIN S. CHANDLER

BY Frederick Breitenfeld
ATTORNEY.

INVENTORS:
GEORGE W. von HOFE
EINO E. LAKSO
AUSTIN S. CHANDLER

BY Frederick Breitenfeld
ATTORNEY.

Patented Oct. 10, 1950 2,525,741

UNITED STATES PATENT OFFICE 2,525,741

LABEL ACTIVATING AND APPLYING APPARATUS

George W. von Hofe, Bound Brook, N. J., and Eino E. Lakso and Austin S. Chandler, Fitchburg, Mass., assignors to New Jersey Machine Corporation, Hoboken, N. J., a corporation of New Jersey Application May 1, 1947, Serial No. 745,290

40 Claims. (Cl. 216—55)

Our present invention relates generally to labels and labeling apparatus, and has particular reference to apparatus for activating adhesive coatings on sheets or labels and for automatically applying and securing the activated labels to articles. From a broader aspect, certain phases of the invention are to be viewed as being directed to the activation of coated sheets and the transportation of such sheets from a supply to a discharge station where they are delivered in activated state, whether or not they are automatically applied to articles at said discharge station.

The invention is primarily concerned with machines and methods for handling labels or sheets having a normally inactive adhesive coating which is susceptible to activation by means of heat. However, some of the features of the invention are not necessarily restricted to the handling of sheets having such thermo-activatable adhesive properties.

The general objects of the invention are to provide a thoroughly practical and relatively simple and inexpensive apparatus by means of which a plurality of labels may be more speedily and efficiently handled in reliable and automatic fashion to withdraw them singly from a supply, transfer them to an activator in the form of an endless conveyor, and transport them to a discharge station at which they arrive in activated state.

To explain the general objectives and nature of the invention, we have herein depicted and shall hereafter describe an illustrative apparatus designed to activate and apply such labels in rapid succession to a plurality of bottles or similar cylindrical articles. As harnessed to such a specific use, the general objects of the invention include improved means for automatically establishing adhesive contact at a label-applying station between the successively activated labels and the articles to be labeled, for advancing said articles in properly timed sequence toward and past said station, and for firmly securing the applied labels to the articles as the articles finally move away from the label-applying station.

Among the more particular objectives of the invention are the provision of improved means for supporting the labels at the supply station in the form of a readily renewable stack, an improved conveyor and heating means (preferably a heated rotatable drum) for activating the labels and transporting them from a pick-up station to a discharge or label-applying station, an improved mechanism at the pick-up station for transferring single labels, in succession, from the label supply to the drum, improved means for advancing and spacing the articles to be labeled, and guiding them past the label-applying station in timed relation to the arrival of activated labels at said station, and improved pneumatic means for applying the labels to said articles at the label-applying station. Other objectives reside in improved pneumatic means for withdrawing the labels from the supply stack, retaining them under control during transfer to the activating drum, effecting such transfer in a reliable fashion and with the labels in accurate spaced relation on the drum, and retaining them in engagement with the latter as they move toward the label-applying station.

Further objects relate to the provision of improved driving and timing instrumentalities for assuring proper cooperative operation of the several parts of the apparatus, means for adjusting the apparatus in numerous respects to comply with varying requirements as to label and article sizes and label positioning, and a general design and arrangement of the parts to produce a workmanlike and compact apparatus which can be economically manufactured, and efficiently utilized over a long period of time, at unusual performance speeds, and requiring minimum attendance.

We achieve these objectives, and such other objects and advantages as may hereinafter appear or be pointed out, in the manner illustratively exemplified in the accompanying drawings in which:

Figure 1 is a perspective view of a labeling apparatus embodying the features of the present invention;

Figures 2, 3 and 4 are diagrammatic plan views which illustrate the functioning of the transfer mechanism at the pick-up station;

Figure 5:
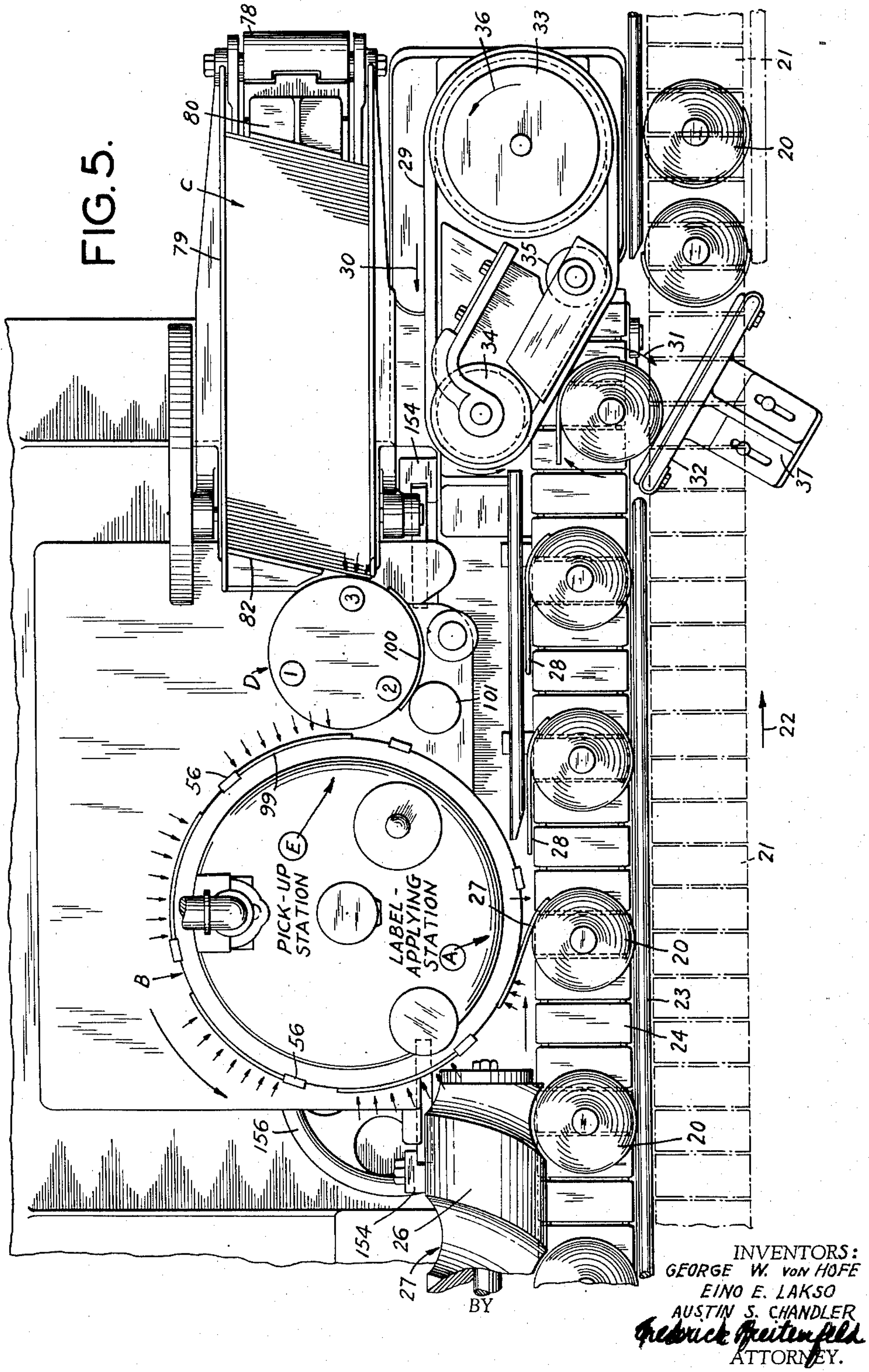
Figure 5 is a plan view similar to Figures 2–4, showing additional parts of the apparatus.

The embodiment of the invention herein chosen for illustration is depicted, as a whole, in Figure 1. We have illustratively shown a series of cylindrical articles such as bottles 20, which are advanced in single file along a main conveyor 21, the direction of movement of this conveyor being represented by the arrow 22. At a predetermined point, represented by the deflecting rail or rails 23, the articles 20 are guided into an offset relation to the conveyor 21, so that their further movement in the direction of the arrow 22 is effected by the parallel conveyor 24. This latter conveyor carries the articles toward and past a label-applying station A. At this station, the path of travel is substantially tangential with respect to an endless conveyor B which we have shown in the form of a circular drum rotating continuously in the direction of the arrow 25. Labels from a supply station C are engaged by a pick-up mechanism D and transferred onto the drum B at the pick-up station E. In their travel from the pick-up station E to the label-applying station A, the labels are activated so that an adhesive contact may be readily established, at the station A, between each label and the corresponding article 20.

*Article advance*

As the articles 20 are deflected at 23 onto the moving conveyor 24, they are brought into engagement with a rotating cylindrical element 26 (see Figures 1 and 5) which operates to space the articles 20 at a predetermined distance from one another. The element 26 is arranged with its axis horizontal and substantially parallel to the direction of movement 22. On its surface is a helical channel 27 whose pitch increases in the direction of movement of the articles 20. The rail 23 is so positioned that the articles 20 are successively engaged in the helical channel 27. The increase in pitch of this helix is of such character, relative to the rotative speed of the cylinder 26, and relative to the speed of advance to the conveyor 24, that the bottles 20 arrive at and pass the label-applying station A in an accurately spaced and timed manner.

As each bottle passes the station A, the leading edge or marginal part of an activated label is brought into adhesive contact with the cylindrical surface of the bottle; this is shown most clearly at A in Figure 5. As the bottles continue to move away from the station A, they carry these partially-affixed labels with them, as indicated at 28 in Figures 1 and 5. Presently, the bottles encounter an obliquely-arranged belt 29 which is moving in the direction of the arrow 30 (Figure 5) and which serves to impart a rotation to each bottle as indicated by the arrow 31 (Figure 5). This action is facilitated by the presence of a parallel abutment surface 32 against which the bottle is rolled. This rolling action serves not only to press the label into firm securement with the bottle, but also guides the labeled bottle back onto the main conveyor 21, this conveyor then serving to carry the labeled articles away from the apparatus.

The belt 29 may be composed of any suitable material, preferably relatively soft material. It is mounted on suitable rollers 33, 34 and 35, any one of which may serve as a driving roller. In the illustrated embodiment, the roller 33 is the one which is caused to be rotated in the direction of the arrow 36 in order to impart the desired movement to the belt 29.

The abutment wall 32 may have a facing of any suitable soft material, such as rubber or the like, and it is mounted for ready adjustment toward and away from the operative part of the belt 29, so that articles of varying diameters may be accommodated. A slotted supporting bracket 37 provides for this adjustability, in a manner which will be readily understood by those skilled in the art.

In similar fashion, the guide rail or rails 23 may be mounted on slotted supporting brackets 38 (Figure 1) in order to permit bottles or articles of varying widths to be accommodated and guided in the manner described.

*The label activator*

As hereinbefore mentioned, the apparatus is primarily designed for use with labels having one face provided with a coating of normally inactive but thermo-activatable adhesive. The activation is accomplished by supporting the labels in sequential series upon a drum which transfers them from the pick-up station E (Figure 1) to the label-applying station A and causes them to be adequately heated during this travel. The details of this drum are illustrated most clearly in Figures 6–9.

Extending upwardly from a substantially circular bottom or end wall 39 is a peripheral cylindrical wall 40 and a concentric inner wall 41. The wall 39 is provided with a central opening, and mounted in this opening is a driving gear 42 which may be secured in position by means of studs 43 and which has a concentric sleeve portion 44 extending upwardly through the drum. The sleeve 44 may be provided with a suitable lining 45. It is mounted for rotation upon a fixed post 46 which extends upwardly from the fixed base of the apparatus, as shown most clearly in Figure 8.

A gear 47 mounted at the upper end of a driving shaft 48 is positioned in meshing relation to the gear 42 (see Figures 8—9) so that rotation of the gear 47 will cause corresponding rotation of the gear 42, hence of the drum.

The peripheral wall 40 is provided with a series of apertures or perforations arranged in rows. One such row is indicated by the reference numeral 49 in Figure 9. Other rows are indicated by the reference numeral 50. Communicating with selected groups of perforations 49 are interior passages. In all but one case, each row communicates with such a passage, as indicated at 51 in Figure 9. The passage 51, which is representative of other similar passages, is axially arranged within the wall 40, and opens onto the end surface 39. The openings of other such passageways are designated by the reference numeral 52 in Figure 9. At predetermined spaced points, certain of the openings 52 are radially elongated as indicated at 53.

Figure 9:
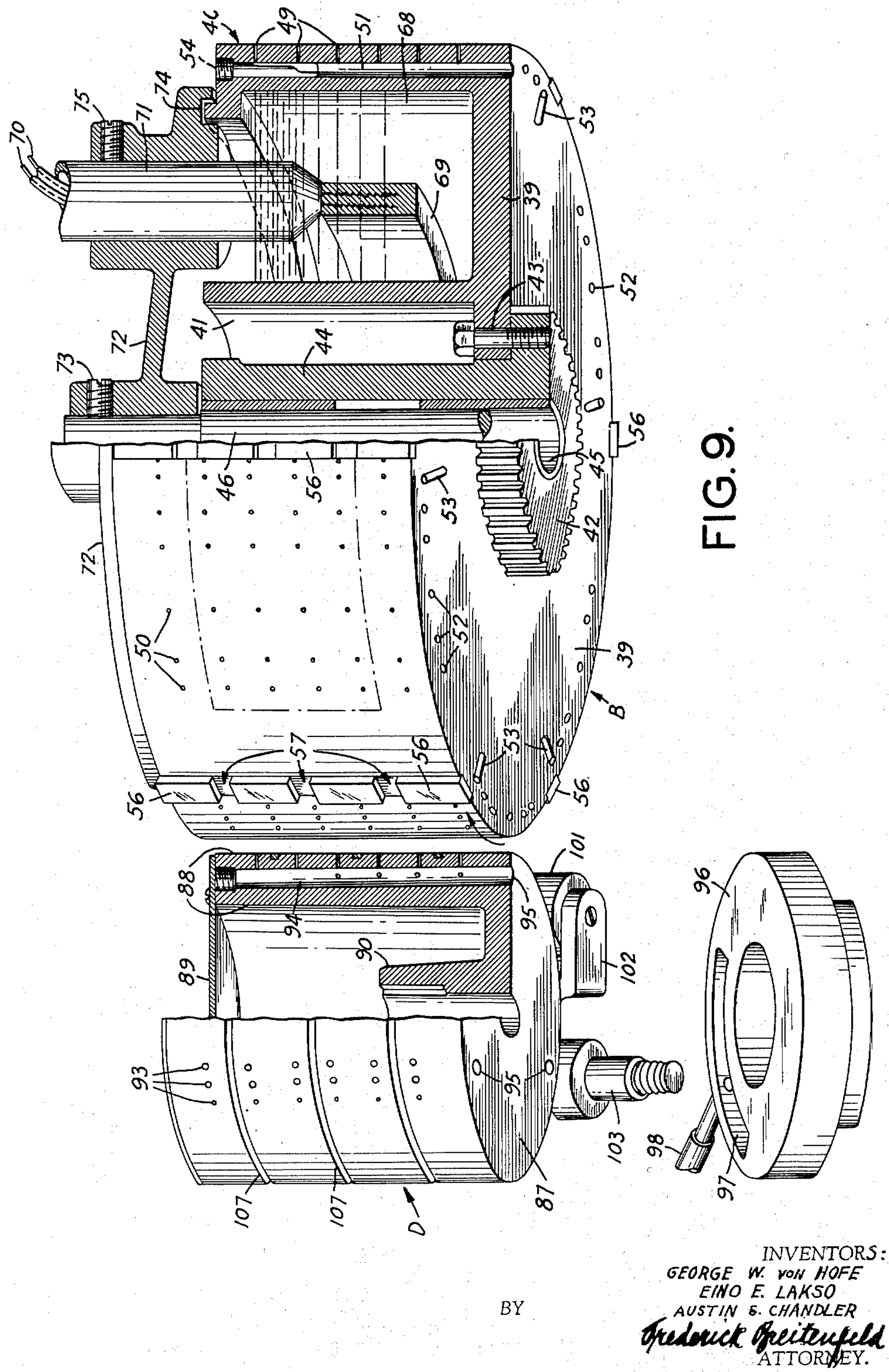
Figure 9 is an exploded view of certain elements which cooperate with those shown in Figure 8.

Each of the passageways 51 is preferably caused to extend to the opposite end surface of the peripheral wall 40, and is plugged by an element such as that shown at 54 (Figure 9). This element is preferably in the form of a mutilated tube so that a slight rotation will serve either to seal a selected number of apertures 49 or establish communication between them and the passageway 51. For example, at the right of Figure 9, we have shown the plug 54 positioned so that the upper two apertures 49 are in communication with the passage 51. A rotation of the plug 54 will cause an unmutilated wall portion to seal these two apertures. Other plugs similar to that shown at 54 are designated by the reference numerals 55 in Figure 7.

These plugs may be of any desired length, so that they may be used to open or plug any selected number of apertures in the respective groups with which they are associated.

Formed on the exterior of the peripheral wall 40, at predetermined angular intervals, are axial ribs 56. For a purpose presently to be described, each rib is preferably formed with transverse cut-outs or notches 57. Thus, in Figure 9 the rib 56 which is visible at the left is formed of four aligned segments. However, these segments constitute a single rib and act as a single abutment for the leading edge of a label, as will be presently explained.

The ribs 56 are evenly spaced around the periphery of the drum. We have shown six such ribs arranged at 60° intervals. Each one lies adjacent to one of the rows of perforations having the radial enlargement 53 at its inner end. Each passageway 51 which terminates in the enlarged opening 53 is in communication with two adjacent rows of apertures 50, as shown most clearly in Figure 7, and one of the rows of apertures 50 is closely adjacent to the corresponding rib 56.

When the parts are assembled, the apertured end wall 39 of the drum rests upon and slides along a fixed valve plate which is preferably composed of arcuate segments. We have shown four such segments in Figure 8. Each of three segments 58 is provided with a port 59 substantially coextensive in area with the segment in which it is formed, while the fourth segment 60 is provided with only a relatively minute port 61. The segment 60 is hollow and is in communication, as at 62, with a source of pneumatic pressure. Each of the ports 59 is in communication with a source of pneumatic suction, the respective connections being indicated by the conduits 63, 64 and 65.

In order to establish a firm yet sliding contact between the wall 39 of the drum and the fixed valve plate formed of the segments 58 and 60, each of the segments is mounted on guide pins 66 and is pressed upwardly by means of suitable compression springs 67.

Obviously, as the drum rotates, those openings 52 or 53 which are in registry with any of the ports 59 will establish communication between a source of pneumatic suction and the corresponding apertures in the peripheral face of the drum. Any such openings which are in contact with the upper surface of the segment 60 will be out of communication with the source of suction. However, the port 61 is so positioned that it will be encountered only by the enlarged openings 53, and as each of these openings passes over the port 61, communication will be established between a source of pneumatic pressure and the rows of apertures with which the opening 53 communicates.

Figure 8:
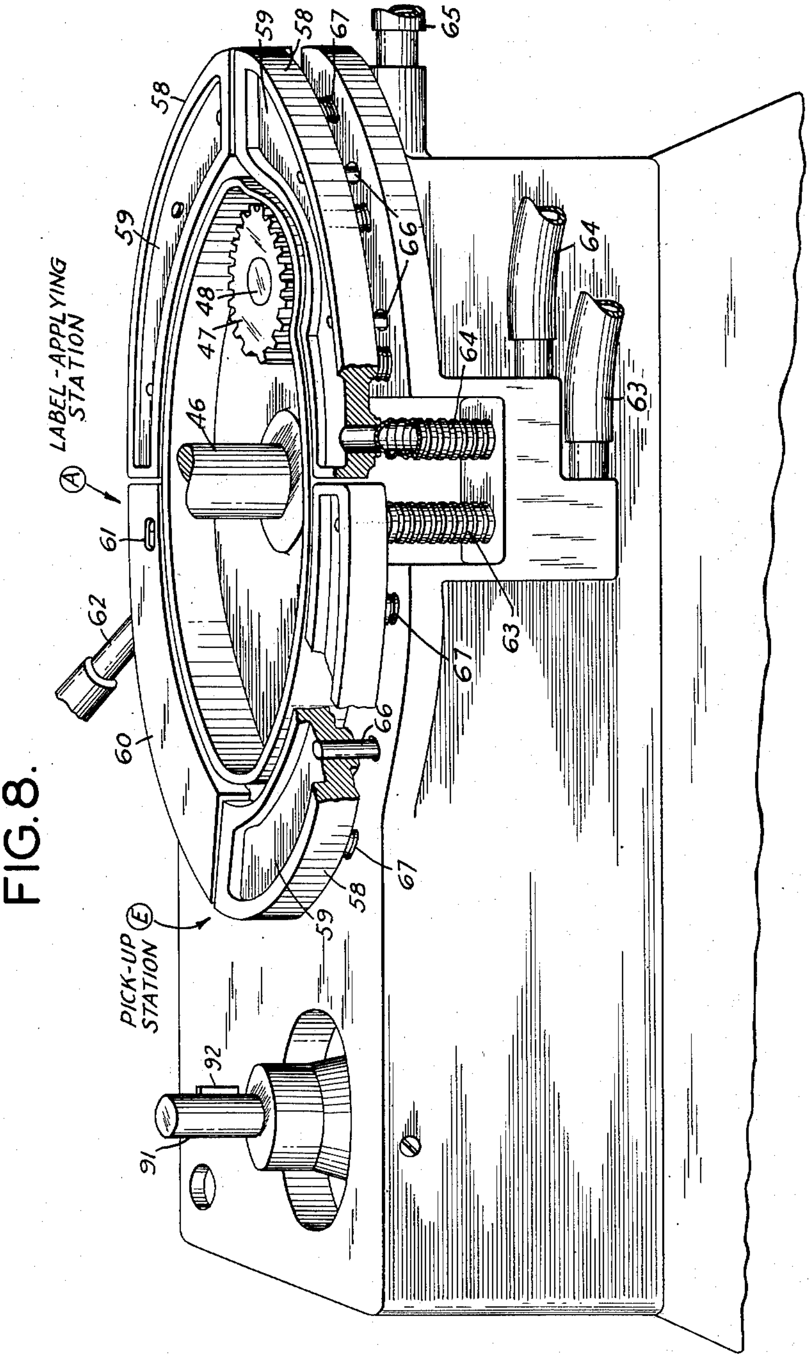
Figure 8 is a perspective view of the underlying parts of certain of the elements shown in Figure 7, parts being omitted, and other parts being broken away for the sake of clearness.

The segments and ports of the valve plate are so positioned that the pick-up station E (Figure 1) is approximately in the region E shown in Figure 8, i. e., in the region where the apertures 52 first come into communication with a suction port 59. Similarly, the pressure port 61 is so positioned that it is approximately at the label-applying station A (Figure 1), this station being similarly designated in Figure 8.

To complete the description of the drum, attention is drawn to the fact that the annular space between the walls 40 and 41 is filled with a liquid 68, such as oil, within which an electric heater 69 is immersed. This heater may be of arcuate shape so as to extend circumferentially through the annular liquid-accommodating chamber. Lead wires 70 extend downwardly through a connection sleeve or box 71. The liquid-accommodating chamber is covered over by means of a circular lid or cover 72 which is secured as at 73 to the fixed post 46. Since this cover is stationary, while the drum rotates, the engagement between the cover and the drum, as at 74, is a loose one so that the drum rotation is not impeded.

The housing 71 may be removably secured within the cover 72, as at 75 (Figure 9). Also extending through the cover, if desired, is a thermometer 76 (Figure 7) and a filling opening 77.

In a manner presently to be described, labels are brought into engagement with the drum surface as shown in Figure 5, each label having its forward edge in firm abutment with one of the ribs 56. The label is positioned with its adhesive coating outward, and it is retained in position against the drum by the suction exerted through the apertures 49, 50. The action of this suction is represented by the series of small arrows shown in Figure 5. During its traverse from the pick-up station to the label-applying station, each label becomes activated, so that by the time it reaches the label-applying station, its adhesive coating is thoroughly tacky. As each label reaches the label-applying station, the corresponding aperture 53 on the under side of the drum comes into registry with the pressure port 61 in the valve plate, and this causes the label to be blown off the drum, as indicated in Figure 5, an adhesive contact being thus established between the leading edge of the label and the bottle or other article 20 which is at that moment at the label-applying station.

*The label supply*

Figure 6:
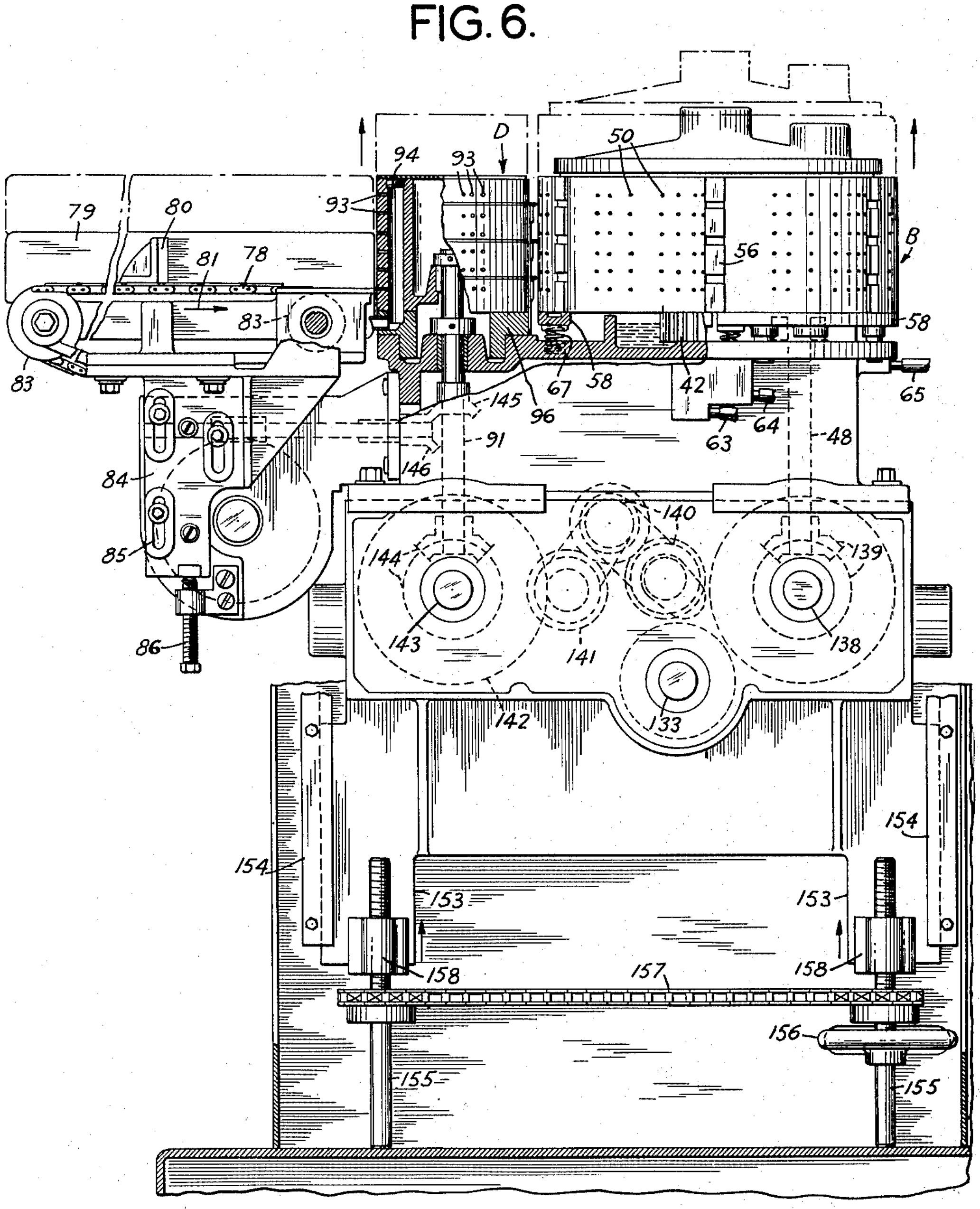
Figure 6 is an elevational view, partly in section, this view being taken from the remote side of the apparatus as viewed in Figure 1.
Figure 7:
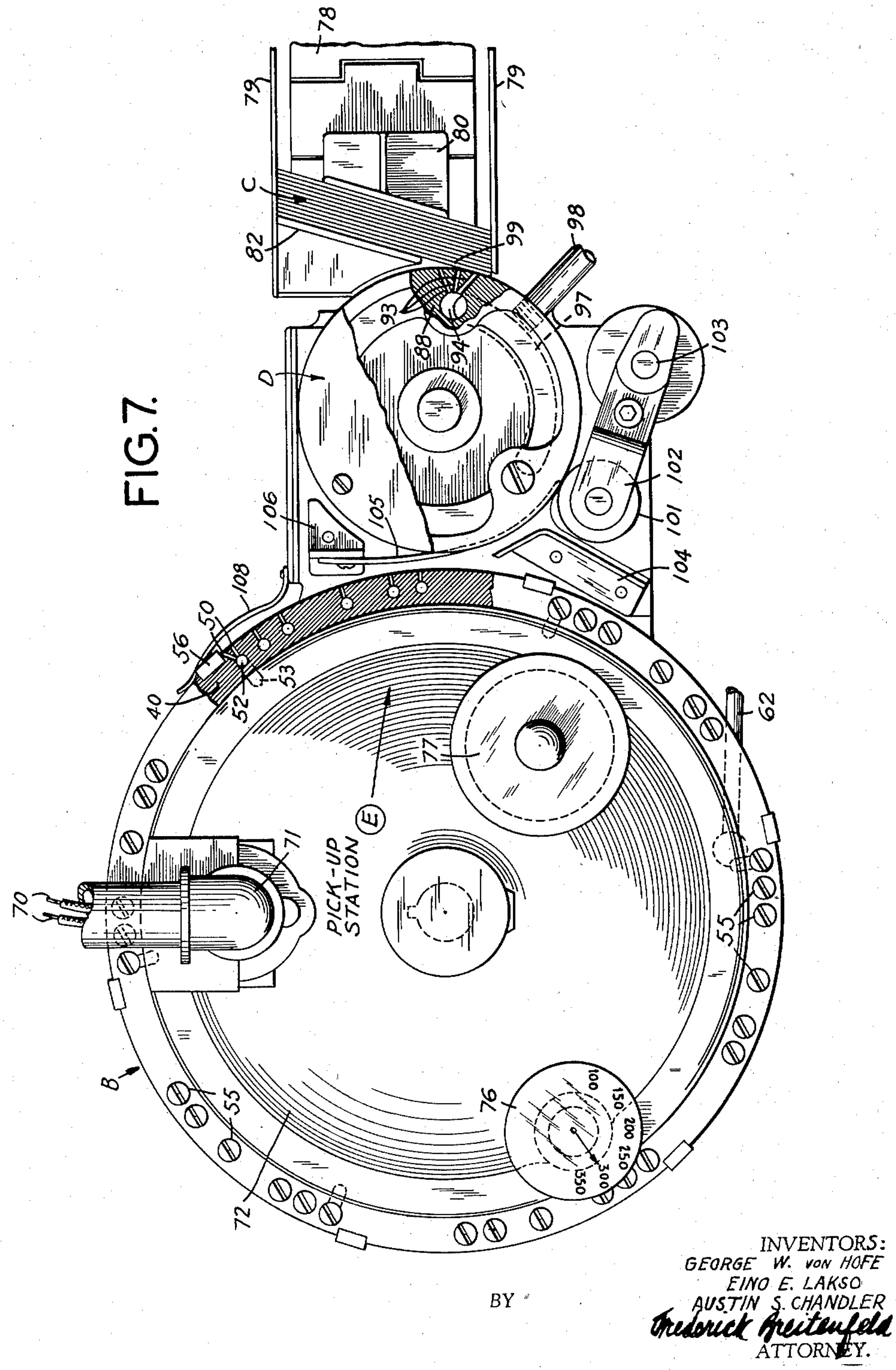
Figure 7 is an enlarged plan view, partly in section, of the elements shown in Figures 2–4.

The labels we have chosen to illustrate are substantially rectangular, and are supported in the form of a stack C upon a moving platform or chain 78 (Figures 5–7). The stack is supported between side walls 79 and a removable prop 80 is positioned on the belt 78 at the rear of the stack. The belt 78 is constantly moved in the direction of the arrow 81 (Figure 6) and exerts a frictional force upon the lower edge of the stack, constantly urging the stack toward the left as viewed in Figures 5 and 7. At convenient intervals, an operator lifts the prop 80, adds any desired number of new labels to the rear end of the stack, and then replaces the element 80. The stack is thus constantly renewable, from the rear, without impairing or impeding the smooth continued operation of the apparatus as a whole.

At its forward end, the stack-supporting frame is provided with an inclined forward abutment wall 82 which is narrower than the stack so that the marginal portion of the foremost label is exposed to the action of the pick-up mechanism.

The belt or platform 78 extends around rollers 83 (Figure 6), and the one at the right of Figure 6 is connected with the driving mechanism to impart the desired movement to the platform 78 in the direction of the arrow 81.

The entire label-supporting structure is mounted upon a bracket 84 which is slotted as at 85 to permit up-and-down adjustment by means of the adjusting stud 86. This adjustment is independent of the balance of the apparatus, and affords a means for setting the label stack at any desired height relative to the drum, thus permitting labels of varying sizes and heights to be accommodated.

The labels are mounted in the stack C with their coated surfaces forward. Since these surfaces are normally inactive, they do not interfere with the pick-up or label-transfer mechanism.

*The label-transfer mechanism*

The function of the pick-up mechanism, indicated in a general way at D in Figure 1, is to withdraw single labels from the stack C and to transfer them, in succession, to the heated activating drum B. The feed element which is preferred is a rotatable cylinder operating intermittently and in timed relation to the movement of the heated drum. This cylinder is illustrated most clearly in Figures 6–9.

As in the case of the drum, it has a bottom wall 87 and a peripheral cylindrical wall 88. It is preferably provided with a closure wall 89 at its opposite end. A concentric wall 90 extending upwardly from the bottom 87 defines an axial opening which is adapted to accommodate the driving shaft 91 (Figure 8) extending upwardly from the body of the apparatus.

Unlike the post 46 which supports the heated drum and which does not rotate, the shaft 91 rotates and imparts this rotation to the cylinder by a keyed interengagement 92.

In the peripheral wall 88 there are groups of suction apertures, and we have illustratively shown each group consisting of three axial rows 93. Each group communicates with an interior passage 94 the opening of which is in the bottom wall 87, as indicated at 95. The groups of apertures are symmetrically spaced from one another by aliquot parts of 360°. We have illustratively shown three such groups, as evidenced by the three openings 95 (Figure 9), these openings being arranged at 120° intervals.

The cylinder rotates upon a fixed valve plate 96 provided with a port 97 in communication, as at 98, with a source of pneumatic suction. The port 97 is approximately 120° in extent. Whenever one of the openings 95 is in registry with this port, the corresponding group of apertures 93 are in communication with the pneumatic suction, otherwise they are sealed from such communication.

The cylinder is operatively interposed between the stack of labels C and the heated drum B in substantially tangential relation to the drum and to the foremost label, as indicated most clearly in Figure 7. The cylinder moves intermittently through 120° increments, and the driving mechanism is such that at the peak of each movement the peripheral speed of the cylinder is momentarily greater than the peripheral speed of the heated drum.

The operation which results is indicated most clearly in Figures 2, 3, 4 and 7. Let it be assumed that the cylinder is at rest in the position shown in Figure 7. One group of apertures 93 is in proximity to the exposed margin of the foremost label 99. As the corresponding passage 94 comes into registry with the suction port 97, the label 99 is drawn against the cylinder surface and retained against the latter. The cylinder then moves through an increment of 120°, and assumes the position shown in Figure 2. In this position (which is a position of rest), the next group of suction apertures has come into proximity with the next label 100, while the label 99 has now assumed the position shown. In this position, the forward part of the label 99 is engaged by an idler roller 101. The use of this idler is not essential, but it facilitates the action of the mechanism. The roller 101 is mounted upon a bracket 102 which is pivoted to the framework at 103 and constantly urged toward the label-supporting cylinder by a yieldable spring (not shown).

During the next increment of movement of the cylinder, the leading edge of the label 99 is brought against one of the abutment ribs 56 (Figure 3), the parts being so positioned with respect to each other, and their operation being so timed, that this encounter inevitably takes place. Since the peripheral speed of the cylinder is momentarily greater that that of the drum, the label is caused to buckle slightly, as indicated in Figures 3 and 4, and this assures a tight and firm positioning of the label against the rib 56.

Needless to say, as the label encounters the drum B, the suction emanating from the port 59 (Figure 8) immediately manifests itself, whereby the label is firmly retained against the surface of the heated drum. Moreover, the suction which has theretofore been holding the label against the transfer cylinder is automatically discontinued since the port 97 terminates at the point where the label commences its tangential movement from the cylinder to the drum.

Figure 4 represents the relative dispositions of the parts just prior to the completion of the second increment of movement. A slight further rotation of the cylinder brings the parts into the relationship shown in Figure 5, which corresponds to that shown in Figure 2. Two of the labels in Figure 5 have been designated 99 and 100, respectively, to conform to the operations described in connection with Figures 2–4.

To prevent premature activation of the coating on the label, a shield 104 is preferably mounted in the position shown in Figure 7. This shield may be so contoured that it also facilitates the guidance of the label from the transfer cylinder to the heated drum.

As a further aid in guiding each label across the gap, it is preferable to mount a series of resilient stripper fingers 105 upon a fixed bracket 106 (Figure 7), these fingers being suitably curved so as to engage in tangential relationship with the cylinder. To accommodate the free ends of these fingers, the cylinder is provided with circumferential grooves 107 (Figure 9).

To aid in locating the label properly upon the heated drum and pressing it thereagainst, immediately after its transfer thereto, a second series of spring fingers 108 is preferably mounted on a fixed support, these fingers extending in the direction of rotation of the heated drum, and bearing yieldably against the surface of this drum (Figure 7). The cut-outs 57 (Figure 9) permit these fingers to remain in smooth contact with the drum surface as it rotates, there being one such cut-out 57 for each finger 108.

*The driving mechanism*

As will be obvious from the description heretofore given, the proper functioning of the apparatus depending upon an accurate coordination of the several movements which are involved. For example, the rotation of the heated activating drum must be in timed relation to the advancement of the articles or bottles approaching and passing the label-applying station. Similarly, the intermittent movements of the rotatable pick-up cylinder must be in timed relation to the drum rotation.

Figure 10:
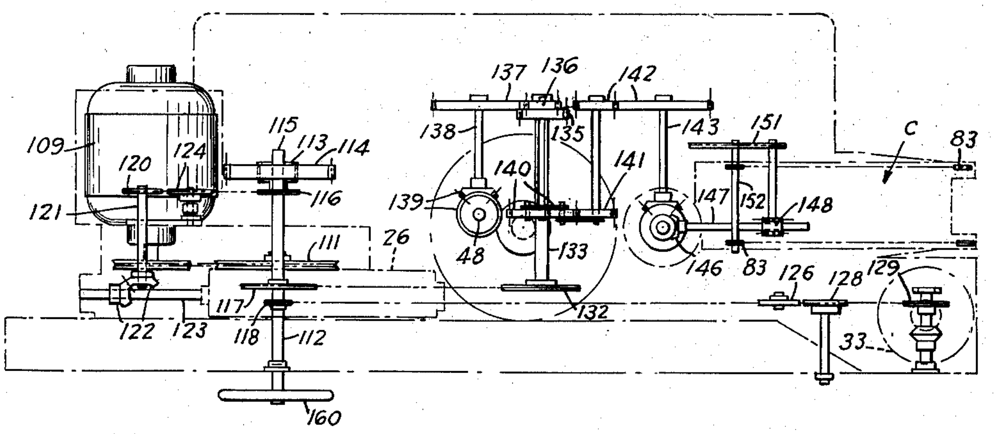
Figures 10 and 11 are plan and elevational views, respectively, of a diagrammatic nature, depicting the driving mechanism.
Figure 11:
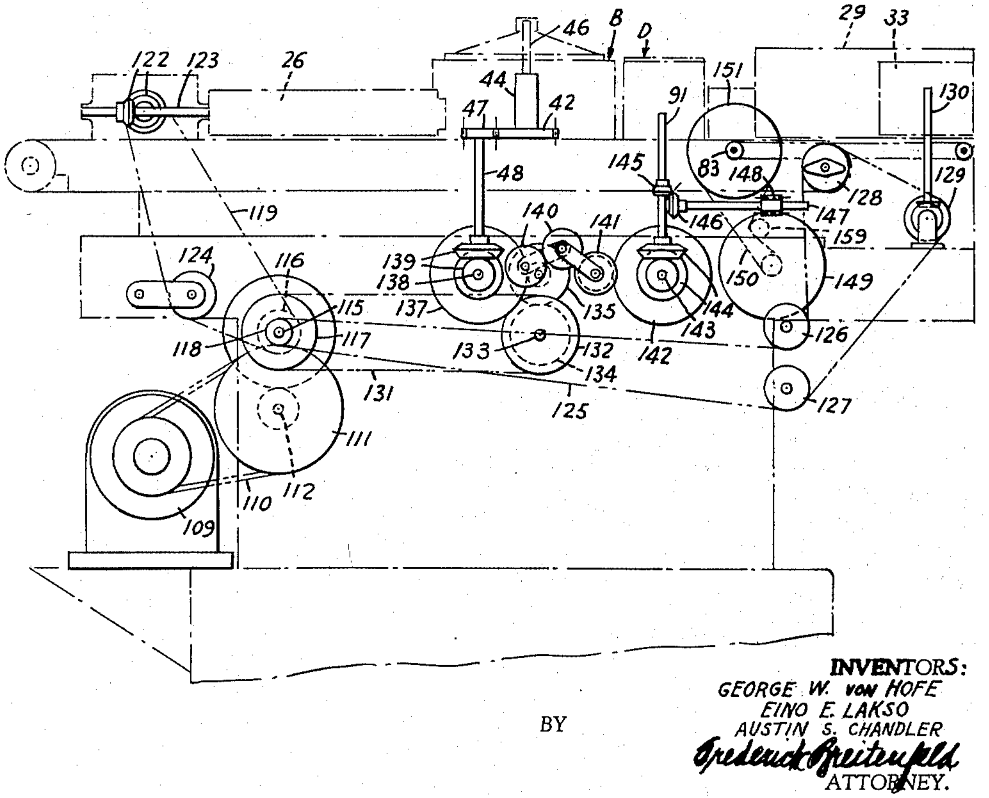

These results may be achieved in the manner diagrammatically indicated in Figures 10 and 11. A driving motor 109 is connected by a belt 110 or the like to a wheel 111 which rotates the main driving shaft 112. (For hand operation, to permit adjustments to be accurately made and checked, a hand wheel 160 (see also Figure 1) may be mounted on the exposed end of this shaft.) The shaft 112 carries a pinion 113 which meshes with a gear 114 on a parallel shaft 115. The latter shaft carries driving pulleys 116, 117 and 118.

The pulley 116 is connected by a belt or equivalent transmission element 119 to a wheel 120 mounted on the shaft 121 through beveled gears 122, this shaft drives the shaft 123 on which the helically-grooved spacing cylinder 26 is mounted. The belt 119 preferably passes around an idler pulley 124.

The wheel or gear 118 transmits movement to a belt or the like 125 which passes around guide pulleys 126, 127 and 128, and drives the wheel 129. Through beveled gears, the wheel 129 rotates the shaft 130 on which the wheel 33 is mounted, this wheel imparting movement to the label-pressing belt 29.

The wheel or gear 117 transmits movement, through a belt or the like 131, to a wheel 132 mounted on the shaft 133. This rotating shaft performs numerous functions. Through gears 134, 135, 136 and 137, rotative movement is imparted to a shaft 138, and through beveled gears 139 a continuous rotative movement is imparted to the shaft 48 on which the driving gear 47 is mounted (see Figure 8). This imparts continuous rotation to the activating drum.

Through a step-motion mechanism depicted by the planetary gear assembly 140, intermittent rotation is imparted to the gear 141, and through meshing gears 142 to the shaft 143. Beveled gears 144 transmit this intermittent movement to the shaft 91 (see Figure 8). This drives the pick-up mechanism.

Also mounted on the shaft 91 is a beveled gear 145 which meshes with a similar gear 146 to drive the shaft 147. A worm 148 on this shaft drives a worm wheel 149, and through a belt 150 the corresponding motion is imparted to the wheel 151 and the shaft 152. This shaft carries and drives one of the pulleys or sprockets 83 (see Figure 6).

*Operation*

The pick-up cylinder D engages individual labels from the stack C and transfers them, in rapid succession, to the heating drum B. Each label is abutted firmly against one of the positioning ribs 56, in the manner most clearly depicted in Figures 2–4. The labels are retained on the cylindrical surface of the drum by pneumatic suction throughout their path of travel from the pickup station E to the label-applying station A. In the meantime, bottles or similar articles are advanced along the main conveyor 21, deflected into engagement with the spacing cylinder 26, and advanced by the moving conveyor 24 toward and past the label-applying station A. As each article passes this station, an activated label arrives at this station, and by pneumatic pressure the leading edge of the label is blown by a blast of heated air into adhesive contact with the article. As hereinbefore described, the articles then continue on, encounter the label-pressing belt 29 which firmly secures the labels to the articles, and the labeled products are rapidly carried away on the main conveyor 21. As many as 300 bottles per minute can be reliably and efficiently labeled by means of this procedure and apparatus.

The adjustment of the label-supporting mechanism in an up-and-down direction has been described in connection with Figure 6 (see elements 84—86). In similar fashion, it is contemplated that the entire assembly of rotating drum and pick-up cylinder be adjustable in an up-and-down direction relative to the moving platform 24, so that labels can be applied to the articles at selected different heights. This is achieved by mounting the assembly referred to upon vertical elements 153 (see Figure 6) which ride in fixed guides 154 and are adjustable vertically by the rotation of screw-threaded elements 155. The screws 155 may be rotated by a hand wheel 156 and by means of a chain 157 which drives the screws 155 simultaneously. Each of these screws is in threaded engagement with a sleeve 158 rigidly secured to the elements 153. This up-and-down adjustment does not affect the driving instrumentalities, as will be apparent upon a study of the parts shown in Figure 11. Nor is the driving of the platform 78 (Figure 6) affected by an adjustment of its height, since an idler pulley 159 (Figure 11) is maintained in constant engagement with the chain or belt 150.

Thus it will be observed that the apparatus is adjustable to accommodate articles of varying shapes, sizes, and thicknesses, and to apply the labels at selected heights. By controlling the speed of the activating drum, and the temperature of the heating liquid within it, the labels may be exposed to the activating influence of the heat for accurately controlled periods of time. In brief, the apparatus is efficient and reliable, of relative simplicity and low cost both from manufacturing and operating standpoints, and well adapted to perform its contemplated functions automatically and at unusual speeds.

Many of the features of the apparatus herein illustrated are obviouslly useful and advantageous, independent of others. In several respects, therefore, the apparatus shown may be modified without affecting the usefulness and advantages of other parts of the apparatus. Also, in many respects, the apparatus may be modified without affecting the basic principles and features of the invention. For example, the conveyor which transports labels from the pick-up station to the discharge station may assume the form of an endless belt or equivalent label-supporting surface; the labels arriving at the discharge station need not necessarily be applied to the passing articles in the particular manner shown and described; the labels need not necessarily be directly applied to articles at that station but may be withdrawn and thereupon handled in other ways before their ultimate application to articles; the articles need not necessarily be bottles, nor cylindrical; if they have shapes other than cylindrical, the spacing means 26 would be of correspondingly different shape or character; the label supply may be in the form of a roll, associated with a means whereby individual sections are severed from the end of the roll; the heating of the conveyor or drum may be achieved by means other than the stationary electric heater shown and the liquid medium in which it is immersed; and under circumstances where the activation of the labels is achieved by means other than heat, the conveyor need not necessarily be heated.

These possible modifications are alluded to merely by way of example, and serve to point out the purely illustrative character of the features herein chosen to be depicted and described. In general, therefore, it will be understood that changes in the details herein described and illustrated may be made by those skilled in the art in a wide variety of ways without necessarily departing from the spirit and scope of the invention as expressed in the appended claims.

Having thus described our invention and illustrated its use, what we claim as new and desire to secure by Letters Patent is:

1. In an apparatus for activating a series of sheets having normally inactive but thermo-activatable adhesive coatings, a continuously rotating drum having means for holding sheets effective at the peripheral surface thereof and adapted to transport a plurality of said sheets in a spaced series from a pick-up station to a circumferentially-remote discharge station, and means for heating said drum surface so that the successive sheets arrive at said discharge station in activated state.

2. In an apparatus for activating a series of sheets having normally inactive but thermo-activatable adhesive coatings, a continuously rotating drum having means for holding sheets effective at the peripheral surface thereof and adapted to transport a plurality of said sheets in a spaced series from a pick-up station to a circumferentially-remote discharge station, and a heated liquid in the interior of said drum for heating said drum surface so that the successive sheets arrive at said discharge station in activated state.

3. In an apparatus for activating a series of sheets having normally inactive but thermo-activatable adhesive coatings, a continuously rotating drum having a peripheral sheet-supporting surface adapted to transport a plurality of said sheets in a spaced series from a pick-up station to a circumferentially-remote discharge station, means for heating said drum surface so that the successive sheets arrive at said discharge station in activated state, and pneumatic means for retaining the sheets on said drum surface between said stations and for blowing them off said surface by a blast of heated air at said discharge station.

4. In an apparatus for successively activating a plurality of stacked labels each of which has a normally inactive but thermo-activatable adhesive coating, a suction drum for continually transporting a succession of labels from a pick-up station to a discharge station, means for heating said drum so that the labels arrive at said discharge station in activated state, and a mechanism at said pick-up station for transferring individual labels, in succession, from said stack to said drum, said mechanism comprising a rotatable cylinder having a peripheral label-supporting surface and provided with means effective at said surface for picking up one of said labels, said cylinder being positioned between said stack and said drum with said surface in substantially tangential relation to both the drum and the end of said stack.

5. In an apparatus for successively activating a plurality of stacked labels each of which has a normally inactive but thermo-activatable adhesive coating, a suction drum for continually transporting a succession of labels from a pick-up station to a discharge station, means for heating said drum so that the labels arrive at said discharge station in activated state, a mechanism at said pick-up station for transferring individual labels, in succession, from said stack to said drum, said mechanism comprising a rotatable cylinder having a peripheral label-supporting surface, said cylinder being positioned between said stack and said drum with said surface in substantially tangential relation to both the drum and the end of said stack, and pneumatic means effective upon said surface for drawing the end label from the stack and retaining it on said surface until it reaches the region of transfer to said drum.

6. In an apparatus for successively activating a plurality of stacked labels each of which has a normally inactive but thermo-activatable adhesive coating, a continuously rotating suction drum for continually transporting a succession of labels from a pick-up station to a discharge station, means for heating said drum so that the labels arrive at said discharge station in activated state, a mechanism at said pick-up station for transferring individual labels, in succession, from said stack to said drum, said mechanism comprising a rotatable cylinder having a peripheral label-supporting surface, and provided with means effective at said surface for picking up one of said labels, said cylinder being positioned between said stack and said drum with said surface in substantially tangential relation to both the drum and the end of said stack, and means for rotating said cylinder intermittently and in timed relation to the rotation of the drum.

7. In an apparatus for successively activating a plurality of stacked labels each of which has a normally inactive but thermo-activatable adhesive coating, a suction drum for continually transporting a succession of labels from a pick-up station to a discharge station, means for heating said drum so that the labels arrive at said discharge station in activated state, a mechanism at said pick-up station for transferring individual labels, in succession, from said stack to said drum, said mechanism comprising a rotatable cylinder having a peripheral label-supporting surface, said cylinder being positioned between said stack and said drum with said surface in substantially tangential relation to both the drum and the end of said stack, means for rotating said cylinder intermittently through angular increments which are aliquot parts of 360°, and pneumatic means effective upon said surface for drawing the end label from the stack and retaining it on said surface until it reaches the region of transfer to said drum, said pneumatic means including groups of suction apertures in said cylinder surface, said groups being circumferentially spaced by amounts corresponding to said increments.

8. In an apparatus for successively activating a plurality of stacked labels each of which has a normally inactive but thermo-activatable adhesive coating, a drum provided with label holding means effective at the peripheral surface thereof and adapted continually to transport a succession of labels from a pick-up station to a discharge station, means for heating said drum so that the labels arrive at said discharge station in activated state, a movable platform frictionally engaging a side edge of said stack, a mechanism at said pick-up station for transferring individual labels, in succession, from said stack to said drum, and means for moving said platform in the direction of said mechanism.

9. In an apparatus for applying to each of a succession of articles a label having a normally inactive but thermo-activatable adhesive coating, a continuously rotating suction drum for transporting a succession of labels from a pick-up station to a label-applying station, a continuously moving article conveyor adapted to advance the articles to be labeled, in succession, past said label-applying station, means for supporting a stack of labels, a mechanism at said pick-up station for transferring individual labels, in succession, from said stack to said drum, means for heating said drum so that the labels arrive at said label-applying station in activated state, and means for moving said drum and said conveyor, and for actuating said mechanism, in timed relationship.

10. In an apparatus for applying to each of a succession of articles a label having a normally inactive but thermo-activatable adhesive coating, a continuously rotating suction drum for transporting a succession of labels from a pick-up station to a label-applying station, a continuously moving article conveyor adapted to advance the articles to be labeled, in succession, past said label-applying station, means for supporting a supply of labels, a mechanism at said pick-up station for transferring individual labels, in succession, from said supply to said drum, means for rotating said drum and for actuating said mechanism in timed relationship to effect a predetermined spacing between labels on said drum, means for heating said drum so that the labels arrive at said label-applying station in activated state, and means for arranging the articles on said conveyor, as they approach the label-applying station, in such predetermined spaced relationship relative to the speed of movement of said conveyor that said articles and labels arrive at corresponding times at said label-applying station.

11. In an apparatus for applying to each of a succession of articles a label having a normally inactive but thermo-activatable adhesive coating, a continuously rotating suction drum for transporting a succession of labels from a pick-up station to a label-applying station past which the articles to be labeled are successively advanced, means for supporting a supply of labels, a mechanism at said pick-up station for transferring individual labels, in succession, from said supply to said drum, means for heating said drum so that the labels arrive at said label-applying station in activated state, and pneumatic means effective at said label-applying station for successively blowing said labels by a blast of heated air into adhesive contact with the corresponding articles.

12. In an apparatus for applying to each of a succession of articles a label having a normally inactive but thermo-activatable adhesive coating, a continuously rotating suction drum for transporting a succession of labels from a pick-up station to a label-applying station, a continuously moving conveyor adapted to advance the articles to be labeled, in succession, past said label-applying station, means for supporting a supply of labels, a mechanism at said pick-up station for transferring individual labels, in succession, from said supply to said drum, means for heating said drum so that the labels arrive at said label-applying station in activated state, means for moving said drum and said conveyor, and for actuating said mechanism, in a timed relationship which brings each article and a corresponding label to the label-applying station at the same time, and pneumatic means effective at said label-applying station for successively blowing said labels by a blast of heated air into adhesive contact with the corresponding articles.

13. In an apparatus for applying to each of a succession of articles a label having a normally inactive but thermo-activatable adhesive coating, a rotating suction drum adapted to transport a succession of labels on its peripheral surface from a pick-up station to a circumferentially-remote label-applying station past which the articles to be labeled are successively advanced, means for heating said drum surface so that the labels arrive at said label-applying station in activated state, and pneumatic means for successively blowing the labels off said surface as they reach the label-applying station, said pneumatic means comprising a fixed valve plate in contact with an end of said drum and provided with a port which communicates with a source of pressure and which is in substantial alignment with said label-applying station, said drum having apertures in said peripheral surface and internal passages between successive groups of said apertures and said end of the drum.

14. In an apparatus for applying to each of a succession of articles a label having a normally inactive but thermo-activatable adhesive coating, a rotating drum adapted to transport a succession of labels on its peripheral surface from a pick-up station to a circumferentially-remote label-applying station past which the articles to be labeled are successively advanced, means for heating said drum surface so that the labels arrive at said label-applying station in activated state, and pneumatic means for retaining the labels on said drum surface between said stations and for successively blowing them off said surface as they reach the label-applying station, said pneumatic means comprising a fixed valve plate in contact with an end of said drum and provided with ports certain of which communicate with a source of suction and at least one of which communicates with a source of pressure, said pressure port being substantially in alignment with said label-applying station, said drum having apertures in said peripheral surface and internal passages between successive groups of said apertures and said end of the drum.

15. In an apparatus for applying to each of a succession of articles a label having a normally inactive but thermoactivatable adhesive coating, a rotating drum having means for holding labels effective at the peripheral surface thereof and adapted to transport a succession of labels from a pick-up station to a circumferentially-remote label-applying station, a conveyor tangentially arranged with respect to said drum and adapted to advance the articles to be labeled, in succession, past said label-applying station, means for heating said drum surface so that the labels arrive at said label-applying station in activated state, and means for shifting the drum axially with respect to said conveyor.

16. In an apparatus for applying to each of a succession of articles a label having a normally inactive but thermoactivatable adhesive coating, a rotating drum having means for holding labels effective at the peripheral surface thereof and adapted to transport a succession of labels from a pick-up station to a circumferentially-remote label-applying station, a conveyor tangentially arranged with respect to said drum and adapted to advance the articles to be labeled, in succession, past said label-applying station, means for heating said drum surface so that the labels arrive at said label-applying station in activated state, means for supporting a supply of labels, a mechanism at said pick-up station for transferring individual labels, in succession, from said supply to said drum, and means for shifting said drum and mechanism as a unit with respect to said conveyor and in the direction of the drum axis.

17. In an apparatus for applying to each of a succession of articles a label having a normally inactive but thermoactivatable adhesive coating, a rotating drum having means for holding labels effective at the peripheral surface thereof and adapted to transport a succession of labels from a pick-up station to a circumferentially-remote label-applying station past which the articles to be labeled are successively advanced, means for heating said drum surface so that the labels arrive at said label-applying station in activated state, a series of longitudinal positioning ribs on said drum surface, means for supporting a supply of labels, and a mechanism at said pick-up station for transferring individual labels, in succession, from said supply to said drum, with the leading edge of each label in abutment with one of said ribs.

18. In an apparatus for applying to each of a succession of articles a label having a normally inactive but thermoactivatable adhesive coating, a rotating drum having means for holding labels effective at the peripheral surface thereof and adapted to transport a succession of labels from a pick-up station to a circumferentially-remote label-applying station past which the articles to be labeled are successively advanced, means for heating said drum surface so that the labels arrive at said label-applying station in activated state, a series of longitudinal positioning ribs on said drum surface, means for supporting a supply of labels, and a mechanism at said pick-up station for transferring individual labels, in succession, from said supply to said drum, with the leading edge of each label in abutment with one of said ribs, said mechanism comprising an intermittently operating feed element adapted to advance the label toward said rib at a lineal speed which is momentarily greater than that of said rib.

19. In an apparatus for applying to each of a succession of articles a label having a normally inactive but thermoactivatable adhesive coating, a rotating drum having means for holding labels effective at the peripheral surface thereof and adapted to transport a succession of labels from a pick-up station to a circumferentially-remote label-applying station past which the articles to be labeled are successively advanced, means for heating said drum surface so that the labels arrive at said label-applying station in activated state, a series of longitudinal positioning ribs on said drum surface, means for supporting a supply of labels, and a mechanism at said pick-up station for transferring individual labels, in succession, from said supply to said drum, with the leading edge of each label in abutment with one of said ribs, said mechanism comprising a cylinder having a peripheral label-supporting surface, and means for rotating said cylinder intermittently and in such predetermined timed relation to the rotation of said drum that the peripheral speed of said cylinder at the peak of its movement is greater than that of said rib.

20. In an apparatus for applying to each of a succession of articles a label having a normally inactive but thermoactivatable adhesive coating, a rotating drum having means for holding labels effective at the peripheral surface thereof and adapted to transport a succession of labels from a pick-up station to a circumferentially-remote label-applying station past which the articles to be labeled are successively advanced, means for heating said drum surface so that the labels arrive at said label-applying station in activated state, a series of longitudinal positioning ribs on said drum surface, means for supporting a supply of labels, a mechanism at said pick-up station for transferring individual labels, in succession, from said supply to said drum, with the leading edge of each label in abutment with one of said ribs, and yieldable means for pressing each label against the drum as it moves away from the pick-up station.

21. In a label-applying apparatus, a continuously moving conveyor adapted to advance articles to be labeled, in succession, to and past a label-applying station, means effective at said station for blowing against each article as it passes, and without interruption of the movement of the article past said station, the marginal part of an adhesively active label, and a label presser operative upon said article after it leaves said station for securing the balance of the label to said article.

22. In a label-applying apparatus, a continuously moving conveyor adapted to advance articles to be labeled, in succession, to and past a label-applying station, and means effective at said station for blowing an adhesively active label into adhesive contact with each article as it passes and without interruption of the movement of the article past said station.

23. In a labeling apparatus, a continuously moving conveyor adapted to advance a series of articles, in succession, toward and past a label-applying station, means operative upon said articles for arranging them in predetermined spaced relationship on said conveyor, a rotating drum having a label-supporting peripheral surface adapted to transport a succession of labels from a pick-up station to said label-applying station, means for rotating said drum in such timed relation to said conveyor that said advancing articles and labels are paired off at said label-applying station, pneumatic means for retaining said labels on said drum surface between said stations and for successively blowing said labels into adhesive contact with the corresponding articles at the label-applying station, means for supporting a supply of labels in the form of a stack lying on its side, said means including a movable table underlying said stack, an intermittently rotating cylinder at said pick-up station and having a peripheral label-supporting surface, said cylinder being positioned between said stack and said drum and adapted to transfer individual labels, in succession, from said stack to said drum, pneumatic means effective upon said cylinder surface for engaging the end label of the stack and for retaining it on said surface until its transfer to said drum, and means for moving said stack-supporting table in the direction of said cylinder.

24. In a labeling apparatus, the combination with the elements set forth in claim 23, of means for adjusting said drum and cylinder as a unit in an up-and-down direction with respect to the level of said conveyor at the label-applying station.

25. In a labeling apparatus, the combination with the elements set forth in claim 23, of means for adjusting said drum and cylinder as a unit in an up-and-down direction with respect to the level of said conveyor at the label-applying station, and means for independently adjusting said stack-supporting table in an up-and-down direction with respect to said cylinder.

26. In an apparatus for applying a label to each of a succession of articles, a drum having means for holding labels effective at the peripheral surface thereof and adapted to transport a succession of labels from a pick-up station to a remote label-applying station past which the articles to be labeled are successively advanced, a series of positioning ribs on said drum surface, means for supporting a supply of labels, and a mechanism at said pick-up station for transferring individual labels, in succession, from said supply to said drum, with the leading edge of each label in abutment with one of said ribs.

27. In an apparatus for applying a label to each of a succession of articles, a drum having means for holding labels effective at the peripheral surface thereof and adapted to transport a succession of labels from a pick-up station to a remote label-applying station past which the articles to be labeled are successively advanced, a series of positioning ribs on said drum surface, means for supporting a supply of labels, and a mechanism at said pick-up station for transferring individual labels, in succession, from said supply to said drum, with the leading edge of each label in abutment with one of said ribs, said mechanism comprising an intermittently operating feed element adapted to advance each label toward one of said ribs at a lineal speed which is momentarily greater than that of said rib.

28. In an apparatus for applying a label to each of a succession of articles, a drum having means for holding labels effective at the peripheral surface thereof and adapted to transport a succession of labels from a pick-up station to a remote label-applying station past which the articles to be labeled are successively advanced, a series of positioning ribs on said drum surface, means for supporting a supply of labels, and a mechanism at said pick-up station for transferring individual labels, in succession, from said supply to said drum, with the leading edge of each label in abutment with one of said ribs, said mechanism comprising a cylinder having a peripheral label-supporting surface, and means for rotating said cylinder intermittently and in such predetermined timed relation to the movement of said drum that the peripheral speed of said cylinder at the peak of its movement is greater than that of said rib.

29. In an apparatus for applying a label to each of a succession of articles, a drum having means for holding labels effective at the peripheral surface thereof and adapted to transport a succession of labels from a pick-up station to a remote label-applying station past which the articles to be labeled are successively advanced, a series of positioning ribs on said drum surface, means for supporting a supply of labels, a mechanism at said pick-up station for transferring individual labels, in succession, from said supply to said drum, with the leading edge of each label in abutment with one of said ribs, and yieldable means for pressing each label against the drum as it moves away from the pick-up station.

30. In an apparatus for applying labels to articles, a continuously moving conveyor adapted to advance articles to be labeled, in succession, past a label-applying station, a continuously moving main article conveyor, means for deflecting articles successively from said main conveyor to said first-named conveyor, means effective at said label-applying station for establishing adhesive contact between labels and the articles passing said station, and pressure means effective upon said articles after they leave said station for securing each label to the corresponding article, said pressure means comprising a belt which is so positioned that it simultaneously guides said labeled articles back to said main conveyor.

31. In a labeling apparatus, a support for a supply of labels coated with thermo-activatable adhesive, a first rotatable cylinder provided with suction means whereby it is adapted to pick individual labels in succession from said supply and carry them on its peripheral surface, a second rotatable cylinder rotating in the opposite direction and positioned directly adjacent to the first and provided with suction means whereby it is adapted to receive and retain on its peripheral surface the labels which are carried directly to it by said first cylinder, and means for maintaining the label-carrying surfaces of said first and second cylinders at temperatures which are respectively insufficient and sufficient to activate said adhesive.

32. In a labeling apparatus, the combination set forth in claim 31, said last-named means including a heating medium on the interior of the second cylinder and a heat shield interposed between said cylinders.

33. In a labeling apparatus, a support for a supply of labels, a continuously rotating label-feeding drum provided with label holding means effective at the peripheral surface thereof, an intermittently rotating pick-up cylinder between said supply and said drum, and pneumaitc means for causing said cylinder to pick a label from said supply during a period of rest and to transfer it to said drum during a subsequent period of rotation.

34. In a labeling apparatus, a support for a supply of labels, a continuously rotating label-feeding drum provided with label holding means effective at the peripheral surface thereof, an intermittently rotating pick-up cylinder between said supply and said drum, pneumatic means for causing said cylinder to pick a label from said supply during a period of rest and to transfer it to said drum during a subsequent period of rotation, and means for causing the peripheral velocity of said cylinder to exceed that of said drum at the time of transfer.

35. In an apparatus for activating a label having a coating of thermo-activatable adhesive on one face thereof, an element having a surface adapted to support said label thereon coated side out, means for heating said surface, and a yieldable pressure element adapted to bear against the coated face of the label to press the uncoated face against said heated surface.

36. In an apparatus for activating a label having a coating of thermo-activatable adhesive on one face thereof, an element having a surface adapted to support said label thereon coated side out, means for heating said surface, a yieldable finger, and means for moving said element past said finger so that said finger will bear yieldably against the coated face of the label as it passes by.

37. In a labeling machine, means to support a supply of labels, a continuously moving conveyor for articles arranged thereon in a spaced series of a given pitch, a drum having means for holding labels effective at the peripheral surface thereof and moving in tangential relation to and at substantially the same velocity as said conveyor, a movable pick-up device, means for operating said device so that it has alternate periods of relatively low and relatively high velocities, said pick-up device being positioned and arranged to pick up a label from said supply during a low-velocity period and to transfer said label to said drum during a subsequent high-velocity period, a relationship between said periods being such that the pitch of the labels on said drum will be equal to the pitch of said articles on said conveyor whereby said articles and said labels will pair off at the region of tangency between said conveyor and said drum.

38. In a labeling machine, a rotating drum having means for holding labels effective at the peripheral surface thereof and adapted to transport a succession of labels from a pick-up station to a circumferentially remote label applying station past which the articles to be labeled are successively advanced, a series of longitudinal positioning ribs on said drum surface, means for supporting a supply of labels, and a mechanism at said pick-up station for transferring individual labels, in succession, from said supply to said drum, with the leading edge of each label aligned with one of said ribs.

39. In a labeling machine, the elements set forth in claim 38, said mechanism comprising an intermittently operating feed element adapted to advance the label toward said rib at a lineal speed which is momentarily greater than that of said rib.

40. In a labeling machine, a conveyor, means for arranging a series of articles on said conveyor in spaced relation of a given pitch, a label carrier having a label supporting surface and means effective at said surface for holding labels thereon, said surface being provided with a plurality of positioning elements arranged in spaced relation of the same pitch as that of said articles, means for applying labels to said carrier in registry respectively with said positioning elements, and means for mounting and moving said carrier so as to transfer said labels from said carrier to said articles respectively.

GEORGE W. VON HOFE.
EINO E. LAKSO.
AUSTIN S. CHANDLER.

REFERENCES CITED

The following references are of record in the file of this patent:

UNITED STATES PATENTS

| Number | Name | Date |
|---|---|---|
| 676,244 | Sherman | June 11, 1901 |
| 805,428 | Siem | Nov. 21, 1905 |
| 961,270 | Tucker | June 14, 1910 |
| 1,007,080 | Evans | Oct. 31, 1911 |
| 1,061,021 | Shults | May 6, 1913 |
| 1,300,408 | Johnson et al. | Apr. 15, 1919 |
| 1,413,795 | Shelor | Apr. 25, 1922 |
| 1,434,170 | Vaughan | Oct. 31, 1922 |
| 1,517,621 | Ermold | Dec. 2, 1924 |
| 1,716,445 | Johnson et al. | June 11, 1929 |
| 2,107,043 | Novick | Feb. 1, 1938 |
| 2,279,724 | Von Hofe | Apr. 14, 1942 |
| 2,290,365 | Wynne | July 21, 1942 |
| 2,382,930 | Williams | Aug. 14, 1945 |
| 2,391,694 | Everett | Dec. 25, 1945 |
| 2,406,205 | Davidson | Aug. 20, 1946 |